(12) United States Patent
Wu et al.

(10) Patent No.: US 11,310,620 B2
(45) Date of Patent: Apr. 19, 2022

(54) AUXILIARY SENSING METHOD AND SYSTEM BASED ON SENSORY SUBSTITUTION

(71) Applicant: SHENZHEN UNIVERSITY, Shenzhen (CN)

(72) Inventors: Kaishun Wu, Shenzhen (CN); Yongzhi Huang, Shenzhen (CN); Lu Wang, Shenzhen (CN); Kaixin Chen, Shenzhen (CN)

(73) Assignee: SHENZHEN UNNERSITY, Shenzhen (CN)

( * ) Notice: Subject to any disclaimer, the term of this patent is extended or adjusted under 35 U.S.C. 154(b) by 0 days.

(21) Appl. No.: 17/087,630

(22) Filed: Nov. 3, 2020

(65) Prior Publication Data
US 2021/0168551 A1    Jun. 3, 2021

(30) Foreign Application Priority Data
Dec. 2, 2019  (CN) .......................... 201911210888.0

(51) Int. Cl.
G06K 9/00 (2022.01)
G09B 21/00 (2006.01)
H04S 7/00 (2006.01)

(52) U.S. Cl.
CPC .......... *H04S 7/303* (2013.01); *G06K 9/00671* (2013.01); *G09B 21/006* (2013.01); *H04S 7/301* (2013.01); *H04S 2420/11* (2013.01)

(58) Field of Classification Search
CPC ... G09B 21/006; H04S 7/303; H04S 2420/01; G06K 9/00671
See application file for complete search history.

(56) References Cited

U.S. PATENT DOCUMENTS

2017/0208413 A1* 7/2017 Bilinski .................. H04S 7/302
2021/0241434 A1* 8/2021 Kim .......................... G06T 5/10

FOREIGN PATENT DOCUMENTS

CN    101040809 A  *  9/2007

OTHER PUBLICATIONS

Machine translation of CN 101040809 A, 11 pages. (Year: 2007).*
(Continued)

*Primary Examiner* — Ping Lee
(74) *Attorney, Agent, or Firm* — Bayramoglu Law Offices LLC (57) ABSTRACT

An auxiliary sensing method and system based on sensory substitution includes: establishing a discrete horizontal plane included angle and a normal vector included angle in three-dimensional space as well as response functions corresponding to different discrete distances, and establishing an acoustic coding library of an object; obtaining a surrounding environmental video; obtaining object information and category of current environment; establishing a three-dimensional sound field of the object according to the image information, the object information and the three-dimensional coordinate information obtained in combination with the acoustic coding library of the object; and adjusting, for objects of different categories, the three-dimensional sound field of each object according to movement information and variations of images, and playing the three-dimensional sound field of each object in real time.

7 Claims, 6 Drawing Sheets

(56) References Cited

OTHER PUBLICATIONS

Algazi et al. "The CiPic HRTF Database"; IEEE Workshop on Applications of Signal Processing to Audio and Acoustics, 4 pages. (Year: 2001).*

* cited by examiner

AUXILIARY SENSING METHOD AND SYSTEM BASED ON SENSORY SUBSTITUTION

CROSS-REFERENCE OF THE RELATED APPLICATIONS

This application is based upon and claims priority to Chinese Patent Application No. 201911210888.0, filed on filed on Dec. 2, 2019, the entire contents thereof are incorporated herein by reference.

TECHNICAL FIELD

The present disclosure relates to the field of sensory substitution technologies, and more particularly, to an auxiliary sensing method and system based on sensory substitution.

BACKGROUND

With the advancement of social science and technology, and the advancement of medical level, among the visually impaired people, the blind people caused by retina injury have been able to restore their visions through surgical retina transplantation and other methods. However, there are still no therapeutic methods for another group of visually impaired people suffering from visual nerve pathway problems. Although genetic screening technologies have reduced the birth rate of disabled babies in recent years, with the growth of the population base and the prolongation of life expectancy, the number of births of disabled babies is still increasing year by year, and the number of blind people is also increasing year by year. Therefore, how to help the blind people to sense the outside world is a problem that needs to be solved.

At present, to enable the visually impaired people to participate in normal activities, commonly used auxiliary devices provided for the visually impaired people include crutches, guide dogs and books in braille, etc. These devices can help, to a certain extent, the visually impaired people to avoid obstacles, guide the blind people to walk and help the blind people to learn knowledge, making their lives a little easier. However, these devices cannot help them to sense the world or rebuild the world.

With the advancement of brain science, people have been able to use non-invasive devices to scan brains for obtaining electroencephalogram (EEG) signals of active regions of the brains. Based on the EEG signals, it is found that when the blind people are trained to use voice as a kind of visual information, vision-related regions in the brains of the blind people, such as occipital lobes, may produce related electrical signals. Such experiments prove that if the blind people are trained to use the voice as input of visual information, visual effects may be produced for the blind people as if they see things with their eyes. This method is visual substitution. Therefore, many research results have defined the method of converting voice into auditory sense. However, these methods are all based on the conversion of picture pixels. Such conversion may produce a lot of information redundancy for the blind people, leading to a failed sensory substitution.

SUMMARY

An objective of the present disclosure is to overcome defects of the above existing technologies by providing an auxiliary sensing method and system based on sensory substitution. By way of sensory substitution, outside information is converted into acoustic signals through a modular method.

According to a first aspect of the present disclosure, there is provided an auxiliary sensing method based on sensory substitution. This method includes following steps:

Step S1: establishing a discrete horizontal plane included angle and a normal vector included angle in three-dimensional space as well as response functions corresponding to different discrete distances, and establishing an acoustic coding library of an object;

Step S2: obtaining a surrounding environmental video in real time by using a visual input unit;

Step S3: obtaining object information and category of current environment by performing an object detection on each frame of visual image based on the obtained environmental video, and calculating a three-dimensional coordinate position of each object from the visual input unit through each frame of visual image information;

Step S4: establishing a three-dimensional sound field of the object according to the image information, the object information and the three-dimensional coordinate information obtained in combination with the acoustic coding library of the object; and Step S5: adjusting, for objects of different categories, the three-dimensional sound field of each object according to movement information and variations of images, and playing the three-dimensional sound field of each object in real time.

According to a second aspect of the present disclosure, there is provided an auxiliary sensing system based on sensory substitution. This system includes: a module configured to establish a discrete horizontal plane included angle and a normal vector included angle in three-dimensional space as well as response functions corresponding to different discrete distances, and to establish an acoustic coding library of an object; a module configured to obtain a surrounding environmental video in real time by using a visual input unit; a module configured to obtain object information and category of current environment by performing an object detection on each frame of visual image based on the obtained environmental video, and to calculate a three-dimensional coordinate position of each object from the visual input unit through each frame of visual image information; a module configured to establish a three-dimensional sound field of the object according to the image information, the object information and the three-dimensional coordinate information obtained in combination with the acoustic coding library; and a module configured to adjust, for objects of different categories, the three-dimensional sound field of each object according to movement information and variations of images, and to play the three-dimensional sound field of each object in real time.

Compared with the existing technologies, the present disclosure has the advantages of using sensory substitution to implement visual substitution for a blind person, and using a method of pattern recognition to solve the problem of excessive information redundancy in the conversion of simple visual images into sound images. The method of the present disclosure can quickly map a stereoscopic image that roughly conforms to the outside world onto an occipital lobe of a brain of the blind person after the blind person is trained.

BRIEF DESCRIPTION OF THE DRAWINGS

The following accompanying drawings are merely used to make exemplary illustration and explanation of the present disclosure, and are not intended to limit the scope of the present disclosure, in which.

DETAILED DESCRIPTION OF THE EMBODIMENTS

In order to make the objects, technical solutions, design methods and advantages of the present disclosure more apparent, the present disclosure is further described in detail below with reference to the accompanying drawings and specific embodiments. It is to be understood that the specific embodiments described herein are only intended to explain the present disclosure, and are not restrictive of the present disclosure.

In all examples shown and discussed herein, any specific values should be interpreted as merely exemplary and not limiting. Therefore, other examples of the exemplary embodiment may have different values.

Technologies, methods and equipment known to those of ordinary skill in the related art may not be discussed in detail, but where appropriate, the technologies, methods and equipment should be considered as part of the specification.

Figure 1:
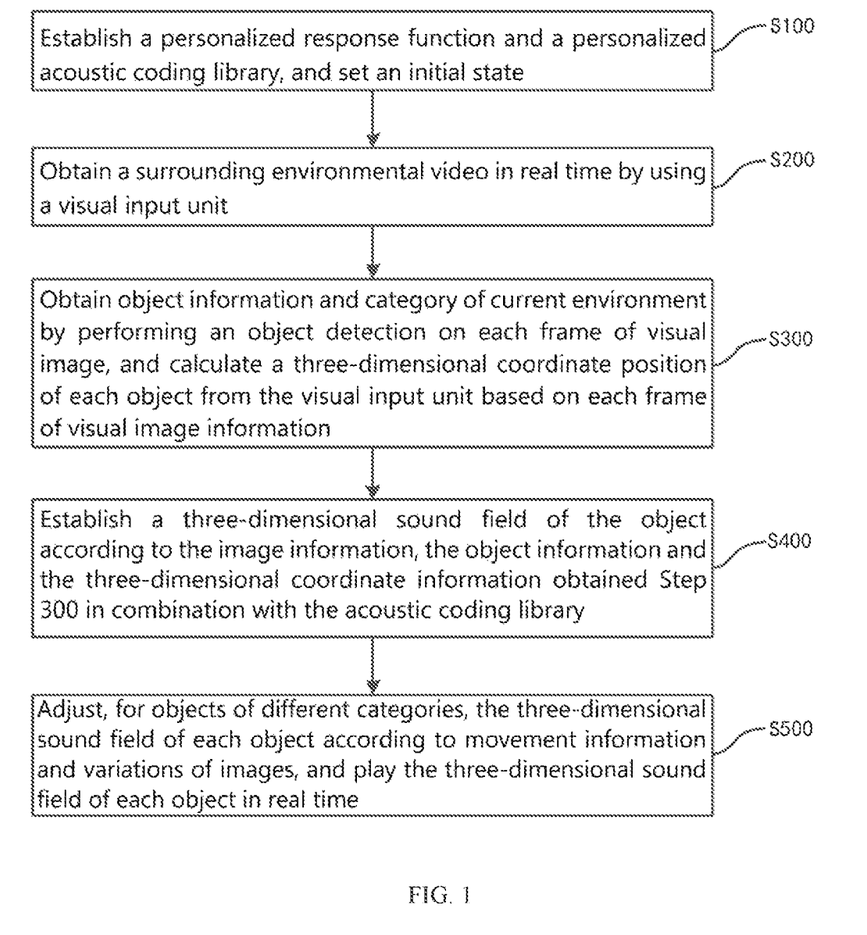
FIG. 1 is a flowchart of an auxiliary sensing method based on sensory substitution according to an embodiment of the present disclosure.

Referring to FIG. 1, the auxiliary sensing method based on sensory substitution according to an embodiment of the present disclosure includes following steps.

In Step S100, a personalized response function and a personalized acoustic coding library are established, and an initial state is set.

Specifically, the Step S100 includes the following substeps.

In Substep S101, the calibration of a camera is completed through a standard chessboard.

For example, the calibration method is as below. The standard chessboard is employed, an intersection of the chessboard represents a detection point, and an actual coordinate position is $(X_W, Y_W, Z_W)$. Based on actual pixel coordinates $(u, v)$, a rotation matrix R of a coordinate system of the camera is calculated according to Formula (1), where R represents a matrix with a size of 3*3, T represents a translation matrix with a size of 3*1, and size factors $$\frac{1}{dx} \text{ and } \frac{1}{dy}$$

may be calculated according to a focal length f of the camera.

$$Z_c \begin{bmatrix} u \\ v \\ 1 \end{bmatrix} = \begin{bmatrix} \frac{1}{dx} & \gamma & u_0 \\ 0 & \frac{1}{dy} & v_0 \\ 0 & 0 & 1 \end{bmatrix} * \begin{bmatrix} f & 0 & 0 \\ 0 & f & 0 \\ 0 & 0 & 1 \end{bmatrix} * \begin{bmatrix} R & T \\ 0^T & 1 \end{bmatrix} * \begin{bmatrix} X_W \\ Y_W \\ Z_W \\ 1 \end{bmatrix} \quad (1)$$

In Substep S102, data from the nine-axis inertial measurement unit are calibrated in horizontal and vertical directions.

Specifically, an inertial sensor is in a quiescent state, and within time t (t may be 50s), variances of three-axis data acc(x), acc(y) and acc(z) are calculated respectively, which are expressed as var(acc(x)), var(acc(y)), and var(acc(z)) respectively. The sensor is determined to be quiescent if the sum of var(acc(x))+var(acc(y))+var(acc(z)) is less than a threshold H. The threshold H is adjusted if the sum of var(acc(x))+var(acc(y))+var(acc(z)) is not less than the threshold H. According to an angular velocity calibration, an Allan variance algorithm is employed to calibrate a quantization noise Q and noises of Angle Random Walk N, zero bias B, angular velocity random walk K and angular velocity ramp R, and a size error Sw and an axial bias Tw are solved out using a least square method.

It is to be understood that in addition to the nine-axis inertial measurement unit, other inertial measurement sensors may also be used.

In Substep S103, pictures of the user and the user's ears are taken using the camera.

For example, a picture of the entire human ear or a side view of the human head is taken from a lateral side of the user using the camera.

In Substep S104, head features of the user are calculated based on the pictures taken.

The calculated head features of the user include a head breadth of the user, a head height of the user, a head depth of the user, an auricle height of the user, an auricle breadth of the user, a neck breadth of the user, a neck length of the user, a neck depth of the user, a torso top breadth of the user, a torso top height of the user, a torso top depth of the user, a shoulder breadth of the user, a head forward bias length of the user, a head forward bias height of the user, a seat height, a head circumference and a shoulder circumference of the user, i.e., seventeen features in total.

In Substep S105, numerical values calculated in Substep S102 and the picture of the human ear are imported into a deep learning network to obtain each discrete horizontal plane included angle and each normal vector included angle in the three-dimensional space as well as HRTFs (Head Related Transfer Functions) response functions corresponding to different discrete distances.

Figure 2:
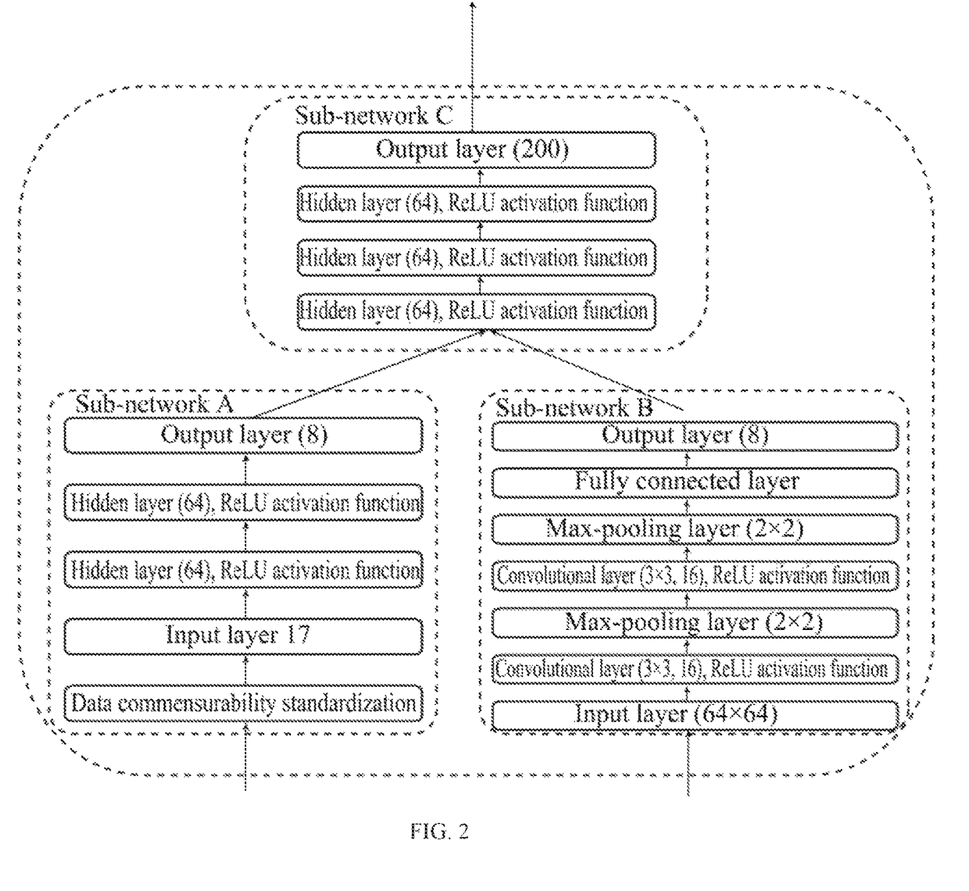
FIG. 2 is a schematic structural diagram of a neural network used when establishing a personalized HRTFs response function according to an embodiment of the present disclosure.

As shown in FIG. 2, the deep learning network includes a sub-network A, a sub-network B, and a sub-network C. Inputs of the sub-network A are human body parameters measured manually (for example, the above 17 head features of the user), and inputs of the sub-network B are the user's head features calculated based on the pictures taken.

In FIG. 2, the ReLU function is $$ReLu(x) = \begin{cases} x & x > 0 \\ 0 & x \leq 0 \end{cases}.$$

The deep learning network needs to be trained in advance. A specific training method is as follows. A large number of human ear and upper body feature data are first collected, and paired response functions are searched by a tester from an existing HRTFs response function library through experiments. For example, a segment of voice synthesized by a certain HRTFs response function is played, such that the tester chooses an angle and a distance where the voice is generated. If the angle and the distance are within the threshold range, the response function at this point is considered reasonable, and a next point is tested. If the angle and the distance are not within the threshold range, the response function is replaced. A fixed value may be set for each group of measurement angle interval and distance interval, such as 10 degrees and 1 m. When the test is completed, the HRTFs response function of the test result is considered as a true value of the output result. The deep learning network is trained with the true value. When in use, the personalized HRTFs response function may be obtained only by importing the parameter of the upper human body and the image of the human ear into the neural network.

Figure 3A:
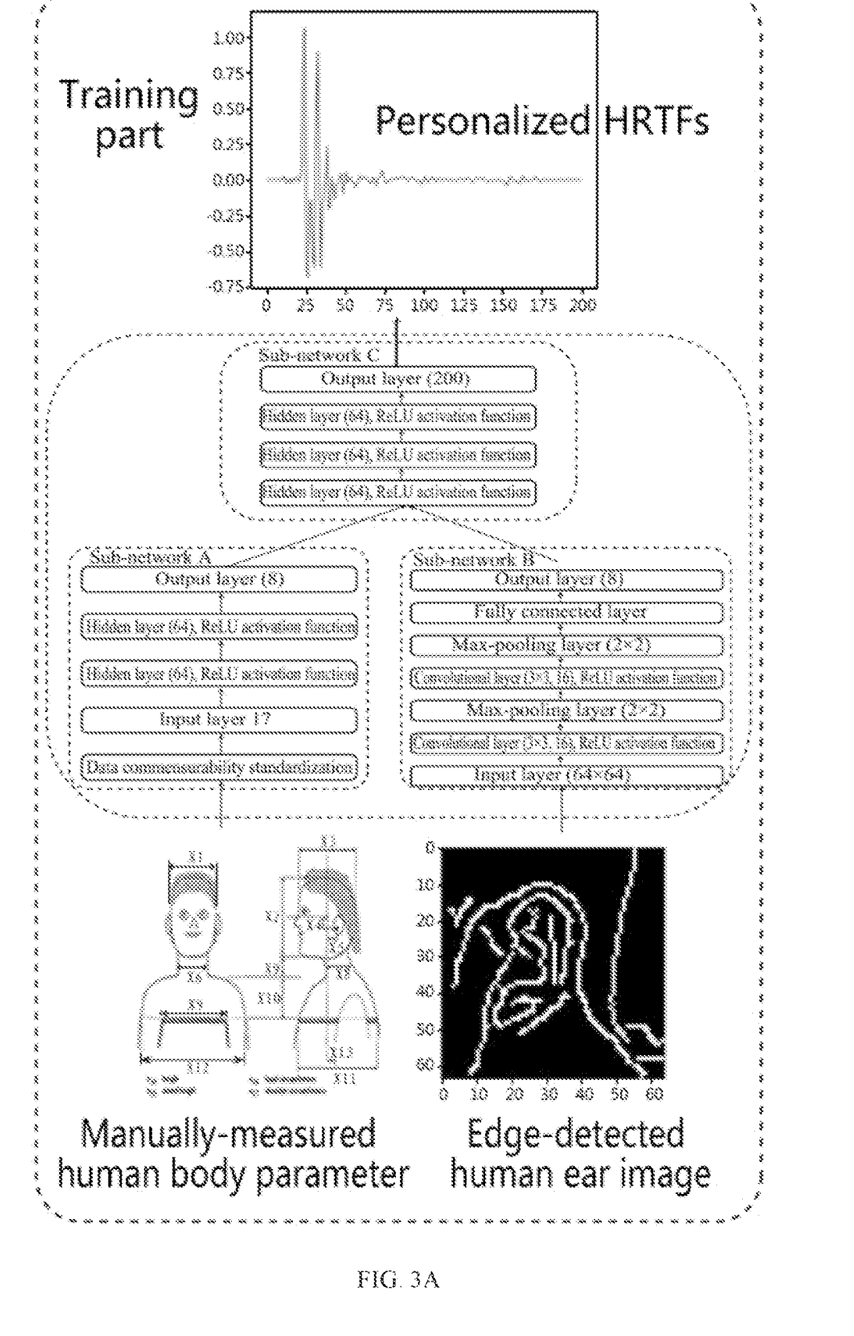
FIG. 3A and FIG. 3B are schematic diagrams showing training and measurement of a neural network used when establishing a personalized HRTFs response function according to an embodiment of the present disclosure.
Figure 3B:
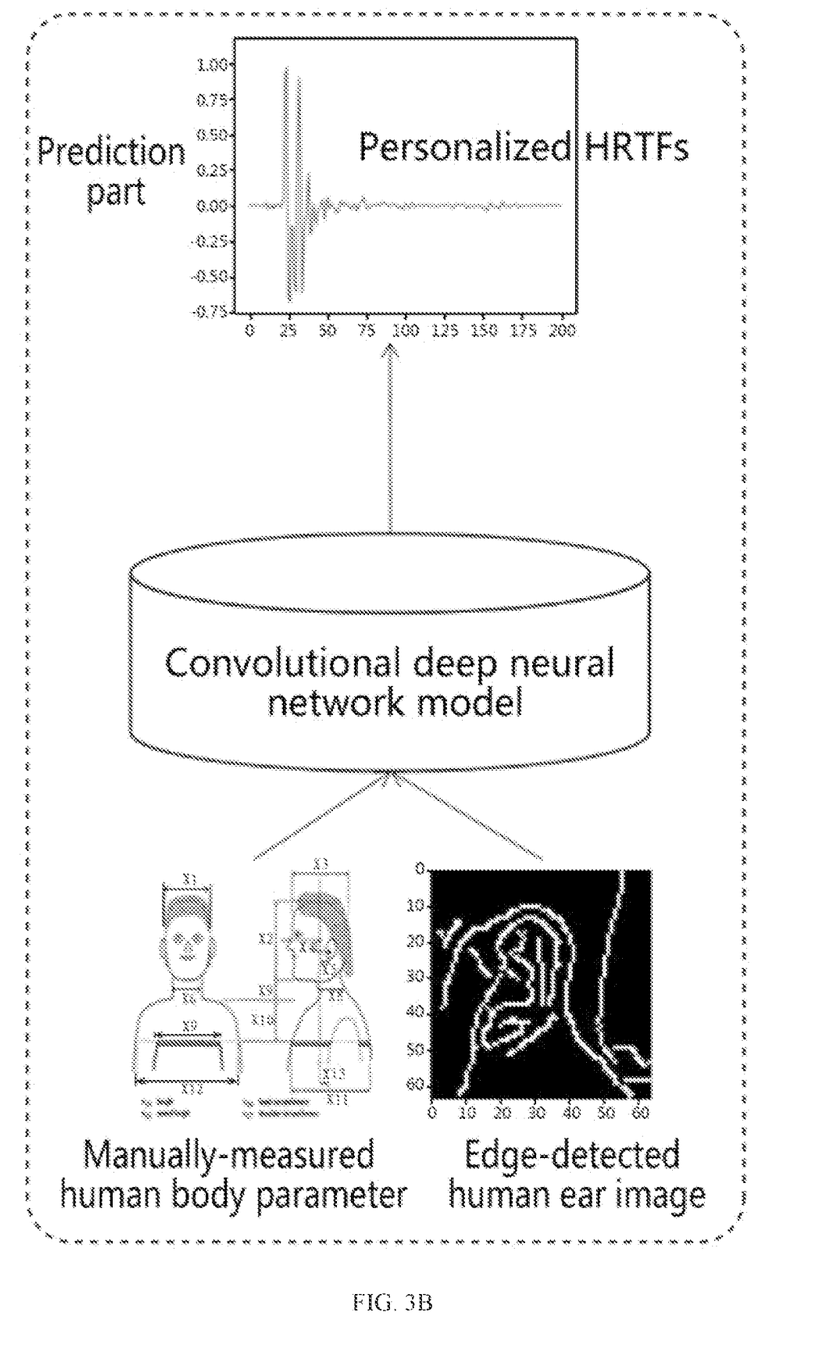

It is to be understood that after the training is completed, for a new user, the trained model may be employed to forecast the HRTFs response function, as shown in FIG. 3A and FIG. 3B.

In Substep S106, each discrete horizontal plane included angle and each normal vector included angle as well as discontinuous points of the HRTFs response functions corresponding to different discrete distances are interpolated using an interpolation method.

A specific implementation method is as below. It is assumed that HRTFs (x1, y1) and HRTFs (x2, y2) are two HRTFs response functions having the closest Euclidean distance from HRTFs (x, y).

The above three HRTFs response functions may be calculated simultaneously based on the following three formulas:

$$HRTFs(x, y) = \frac{y_1^2}{y_2^2} HRTFs(x, y_1) \quad (2)$$

$$HRTFs(x, y_1) = HTRFs(x_1, y_1) + \left[\frac{HTRFs(x_2, y_1) - HTRFs(x_1, y_1)}{x_2 - x_1}\right](x - x_1) \quad (3)$$

$$HTRFs(x_2, y_1) = \frac{y_2^2}{y_1^2} HRTFs(x_2, y_2) \quad (4)$$

and such a calculation formula is obtained as below:

$$HRTFs(x, y) = \quad (5)$$
$$\frac{y_1^2}{y_2^2}\left[HTRFs(x_1, y_1) + \frac{\frac{y_2^2}{y_1^2} HTRFs(x_2, y_2) - HTRFs(x_1, y_1)}{x_2 - x_1}(x - x_1)\right]$$

In Substep S107, acoustic coding libraries corresponding to various objects may be selected or established.

For example, codings of voices represented by various different objects may be customized, and the determined codings are updated into the libraries to represent the objects.

For settings in an initial state, the user may wear an auxiliary sensing system for blind people based on sensory substitution, and the state of the user's head at this moment may be set as the initial state.

In Step S200, a surrounding environmental video is obtained in real time by using a visual input unit.

For example, a multi-view visual input unit may be enabled to transmit a signal from the multi-view visual input unit to a processor in real time. The multi-view visual unit can take images from multiple angles. In the following, two images (the left image and the right image) will be used as examples to make an introduction.

In Step S300, object information and category of current environment are obtained by performing an object detection on each frame of visual image, and a three-dimensional coordinate position of each object from the visual input unit is calculated based on each frame of visual image information.

Specifically, the Step S300 includes the following substeps.

In Substep S301, each frame of image in a real-time video is imported into a deep neural network to detect an object by using the deep neural network so as to obtain an image position and a category of each object in each frame of the multi-view visual input unit, and it is distinguished between a fixed obstacle and a non-fixed obstacle.

Figure 4:
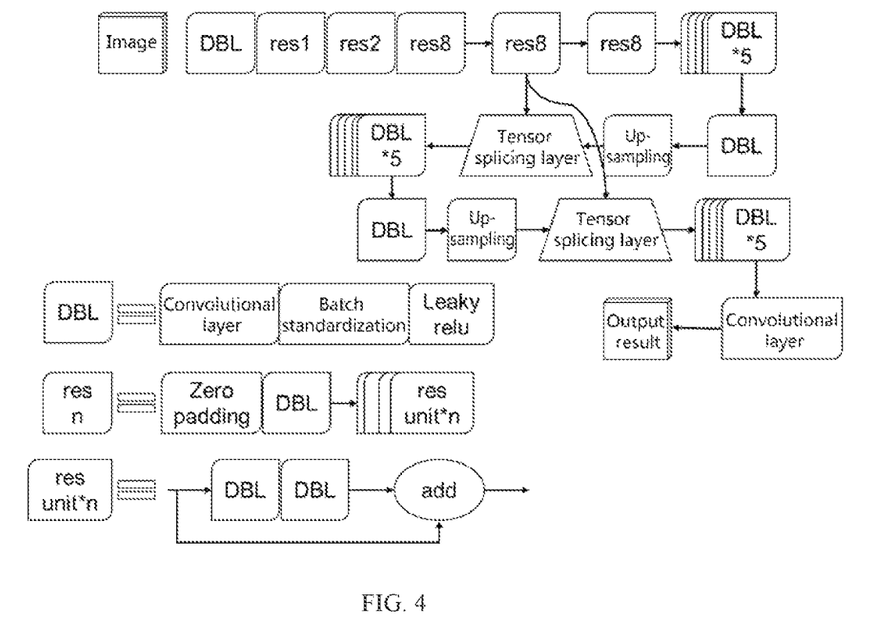
FIG. 4 is a schematic diagram of a network structure used when establishing an object detection according to embodiments of the present disclosure.

The deep neural network used is as shown in FIG. 4, where a LeakyReLU function is $$Leaky\ ReLu(x) = \begin{cases} x & x \geq 0 \\ \dfrac{x}{a} & x < 0 \end{cases},$$

and where a is a fixed parameter greater than 1.

Examples of the fixed obstacle include pillars, trees, and walls, etc.

In Substep S302, an object frame is segmented to obtain an object image in a current frame.

In Substep S303, the object image in the object frame is abstracted to obtain a hash value of an image in the current frame.

A specific implementation method is as below. A mean value $(\overline{X}, \overline{Y})$ in the current image matrix is calculated, where $\overline{X}, \overline{Y}$ are vectors of n*1. If a value of the image at a point is greater than a corresponding mean value in the $(\overline{X}, \overline{Y})$, the value at this point is set as 1, otherwise the value at this point is set as 0. Therefore, an n-dimensional hash matrix Hash may be obtained.

In Substep S304, a Hamming distance between the hash value of the left image and the hash value of the right image is calculated to obtain an image frame corresponding to the same object in the left image and the right image through the Hamming distance.

A specific implementation method is as below. The hash matrix is subject to bitwise XOR, and the obtained values are summed. The specific formula is as follows:

$$HamDis = \sum_{i,j \in A,B} Hash1(a_i, b_j) \oplus Hash2(a_i, b_j),$$

and the matrix with the smallest HamDis is selected as the image frame corresponding to the same object.

In Substep S305, it is detected whether there exists the same object in the current image and a previous frame of detection image, the object is marked as a non-disappearing object if there exists the same object, a displacement vector of the same object is calculated, and an object beyond an image visual field is marked as a disappeared object.

A specific method for calculating the displacement vector is as below. Assuming that the position of the object in the previous detection frame is $(x_0, y_0)$ and the position of the object in the current detection frame is $(x_1, y_1)$, the displacement vector may be regarded as a vector $\overline{(x_1-x_0, y_1-y_0)}$.

In Substep S306, a corner-point analysis is performed on an object in the same image frame of the left image and the right image obtained in Substep S304 to obtain a corner-point matrix of the object.

A specific method of corner point detection is as below. First a point p is selected as a center of a circle $$N = \sum_{x \forall (circle(p))} |I(x) - I(p)| > \varepsilon_d,$$

where $I(x)$ represents a gray level of any point on the circle, and $I(p)$ represents a gray level of the center of the circle, $\varepsilon_d$ represents a threshold of a gray level difference. If N is greater than a given threshold, which generally is three-quarters of the surrounding circle points, p is considered as a corner point.

In Substep S307, it is calculated a hash value of the corner-point matrix obtained in Substep S306 for the left image and the right image.

In Substep S308, the hash value of the corner-point matrix obtained in Substep S307 for the left image and the right image is imported into the same space for clustering.

In Substep S309, it is searched for, by clustering, points with a closest hash value of each corner-point matrix for pairwise coupling.

In Substep S310, the pairwise coupled points are connected.

In Substep S311, a vertical bias angle from a horizontal plane generated by a current user's head up and down movement, a horizontal heading angle generated by moving the user's head from side to side between a plane perpendicular to a center line of a visual input unit in a previous state and a plane perpendicular to the center line of the visual input unit in a current state, and a horizontal rolling angle formed by lateral inclination and a normal vector of the horizontal plane are calculated according to a nine-axis inertial measurement unit.

In Substep S312, a corner point where a paired connecting line is a non-horizontal connecting line is removed.

In Substep S313, distances of all objects with respect to the visual input unit are calculated according to the corner point and the connecting line selected in Substep S312.

A specific distance measurement method is employed to calculate the distance $dis = B - (X_R - X_L)$ between two points, where $X_R - X_L$ represents a parallax of the two corner points, B represents the distance of the center of the visual input unit, and the distance between the corner points in three dimensions may be represented by $$Deep = \frac{fB}{X_R - X_L},$$

where f represents the focal length of the camera.

In Substep S314, a vertical height of an object with respect to the horizontal plane of the visual input unit is calculated according to the calculated distance of the object with respect to the visual input unit as well as a vertical bias between the object and a center position of the visual input unit.

In Substep S315, a horizontal bias distance of the object with respect to a center of the visual input unit is calculated according to the calculated distance of the object with respect to the visual input unit as well as a horizontal bias between the object and the center position of the visual input unit.

A method for calculating the vertical height is $$Y = \frac{YBias \times Deep}{f},$$

where YBias represents the vertical bias from the object to the center point.

A method for calculating the horizontal bias is $$X = \frac{XBias \times Deep}{f},$$

where XBias represents the horizontal bias from the object to the center point.

In Step S400, a three-dimensional sound field of the object is established according to the image information, the object information and the three-dimensional coordinate information obtained in Step 300 in combination with the acoustic coding library.

Step S400 specifically includes following substeps.

In Substep S401, an acoustic coding library corresponding to each of the objects is searched for according to categories of all objects obtained in Step S300.

A specific acoustic coding is that a code element is composed of frequency, waveform, wavelength, and combination methods. Different combination methods may be selected for the code element according to type information of the object, including information such as what the object is, what size the object is, and what state the object is.

In Substep S402, a response function of each object is obtained by importing, into an HRTFs response function, a distance of each object with respect to a horizontal plane center of the visual input unit, a distance of each object with respect to a vertical plane where the visual input unit is located, and a height of each object with respect to a horizontal plane of the visual input unit which are calculated in Step S300.

In Substep S403, stereo voice corresponding to each object is calculated according to the acoustic coding library of each object calculated in Substep S401 and the response function calculated in Substep S402.

A specific method for synthesizing the three-dimensional sound field is as follows: Synthesized Voice=AcousticCoding⊗HRTFs, where HRTFs represents the response function, AcousticCoding represents the acoustic coding corresponding to the object, and ⊗ represents a convolution symbol.

In Step S500, it is adjusted, for objects of different categories, the three-dimensional sound field of each object according to movement information and variations of images, and the three-dimensional sound field of each object is played in real time.

Step S500 specifically includes following substeps.

In Substep S501, variation values of the vertical bias angle, the horizontal heading angle and the horizontal rolling angle are obtained for a previous frame and a current frame according to Step S300.

In Substep S502, it is determined whether the variation values of the three angles are within a threshold range. If the variation values of the three angles are within the threshold range, the current frame is skipped, and variation values of the three angles are calculated for a next frame, and the next step is proceeded until the variation values of the three angles are beyond the threshold range.

In Substep S503, a direction of human movement is determined based on calculation of the nine-axis inertial measurement unit.

In Substep S504, a position of a fixed obstacle with respect to the fixed obstacle in a previous detection frame is extracted through an object marked as being disappeared in Step S300.

In Substep S505, the position of a fixed obstacle marked as being disappeared in a current detection frame is calculated according to the variation values of the three angles calculated in Substep S502 and the direction of human movement calculated in Substep S503.

In Substep S506, a three-dimensional position of the object in Substep S505 is updated.

In Substep S507, the three-dimensional position updated in Substep S506 is substituted into the three-dimensional sound field of the obstacle to determine whether a reminder range is exceeded, the three-dimensional sound field of the obstacle is retained if the reminder range is not exceeded, or otherwise the three-dimensional sound field of the obstacle is cleared.

In Substep S508, it is searched for, according to a non-fixed obstacle marked as being disappeared obtained in Step S300, a displacement vector of the non-fixed obstacle disappearing in the previous detection frame of a field of view of an image frame.

In Substep S509, voice from the non-fixed obstacle marked as being disappeared is superimposed into a three-dimensional space vector of the voice from the non-fixed obstacle according to the displacement vector of the non-fixed obstacle.

In Substep S510, three-dimensional coordinates of an HRTFs response function of the non-fixed obstacle marked as being disappeared are updated.

In Substep S511, an acoustic coding of the non-fixed obstacle is attenuated to obtain a smoothed acoustic coding.

In Substep S512, the attenuated acoustic coding is convolved with the HRTFs response function of the non-fixed obstacle if a value of the attenuated acoustic coding is still greater than a threshold to obtain a three-dimensional sound field of the non-fixed obstacle object at this moment, or otherwise the three-dimensional sound field of the non-fixed obstacle is cleared.

In Substep S513, the three-dimensional sound field of the fixed obstacle marked as being disappeared, the three-dimensional sound field of the non-fixed obstacle marked as being disappeared, and a three-dimensional sound field corresponding to an object in an image are simultaneously superimposed.

In Substep S514, the synthesized voice is played.

Correspondingly, the present disclosure also provides an auxiliary sensing system based on sensory substitution. This system is configured to implement one or more aspects of the above method.

Figure 5:
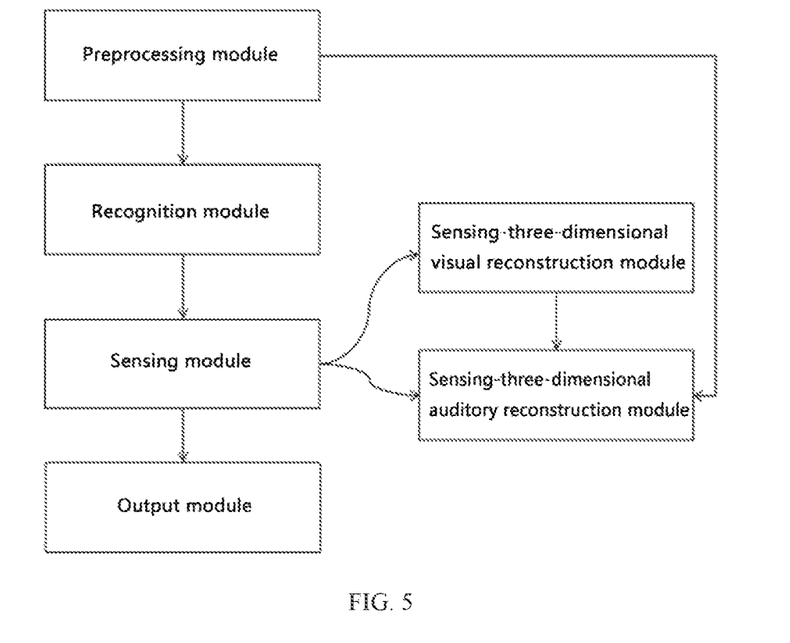
FIG. 5 is a schematic diagram of an auxiliary sensing system based on sensory substitution according to an embodiment of the present disclosure.

For example, as shown in FIG. 5, the system includes: a preprocessing module, configured to calibrate the camera, calibrate the nine-axis inertial measurement unit, and accomplish personalized setting of the HRTFs response function based on characteristics of a user's ears and upper body as well as establishment of an acoustic coding library and setting of an initial state of the user's head; a recognition module, configured to input an outside visual environment, detect an object in inputted visual information, and segment the object in the visual information; a sensing-three-dimensional visual reconstruction module, configured to input visual information, establish different hash values for different objects in the visual information, search for the same object represented by the visual information in different visual input units, search for the corner points of the same object, and pair and filter the corner points of the same object, and calculate three-dimensional parameters of the visual object; a sensing-three-dimensional auditory reconstruction module, configured to input visual information and movement information, select an acoustic coding, perform three-dimensional reconstruction on voice using the HRTFs response functions, and attenuate an object moving out of the visual frame; and an output module, configured to output, in real time, the voice obtained after the auditory reconstruction is completed and adjust a volume.

Figure 6:
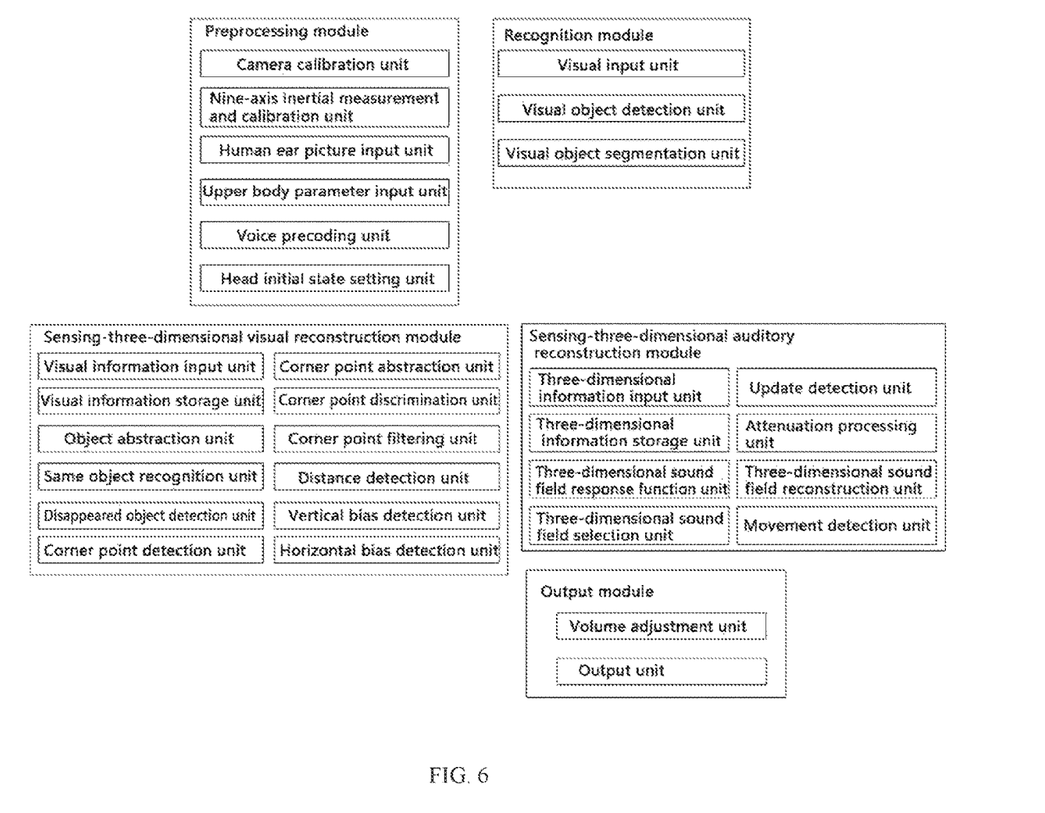
FIG. 6 is a schematic diagram of an auxiliary sensing system based on sensory substitution according to another embodiment of the present disclosure.

Further, referring to FIG. 6 (not showing all units), the preprocessing module includes: a camera calibration unit, configured to calibrate the camera; a nine-axis inertial measurement and calibration unit, configured to adjust an output value of the nine-axis inertial measurement unit during calibration; a human ear picture input unit, configured to establish a personalized HRTFs response function; an upper body parameter input unit, configured to establish a personalized HRTFs response function; a voice precoding unit, configured to establish a personalized voice coding; and a head initial state setting unit, configured to set an initial state of the head.

Further, the recognition module includes: a visual input unit, configured to receive visual information from the outside world and input the visual information into the system; a visual object detection unit, configured to detect an object and a category in the visual information inputted into the system; and a visual object segmentation unit, configured to segment the object detected in the visual information.

Further, the sensing-three-dimensional visual reconstruction module includes: a visual information input unit, configured to receive picture information and object category information segmented from the object in the visual information; a visual information storage unit, configured to store the picture information and the object category information segmented from the object in the visual information; an object abstraction unit, configured to abstract the segmented object as a hash value; an object discrimination unit, configured to pair the same object in different visual input units using the abstracted hash value; a same object recognition unit, configured to recognize an object the same as a previous frame; a disappeared object detection unit, configured to detect a discrimination between an object in the current frame and an object in the previous detection frame, mark an undetected object as a disappeared object and mark hold time, clear the object when the hold time expires, and re-mark an object detected being in the hold time and marked as a disappeared object as a non-disappearing object; an object displacement vector detection unit, configured to detect a displacement vector generated by the same object in the previous frame and the current frame; a corner point detection unit, configured to detect a corner point, in an image, of the same object of different visual input units after the pairing is completed; a corner point abstraction unit, configured to abstract detected corner point information as a hash value; a corner point discrimination unit, configured to search for similar corner points in the same object using the abstracted hash value; a corner point filtering unit, configured to filter the corner point using information of the nine-axis inertial measurement unit; a distance detection unit, configured to calculate a distance from an object to the visual input unit by using a position of the same corner point in different visual input units in the image; a vertical bias detection unit, configured to calculate a vertical bias using the distance from the object to the visual input unit to obtain a vertical bias height of the object with respect to a plane of the visual input unit; a horizontal bias detection unit, configured to calculate a horizontal bias using the distance from the object to the visual input unit to obtain a horizontal bias distance of the object with respect to a center of the visual input unit.

Further, the sensing-three-dimensional auditory reconstruction module includes: a three-dimensional information input unit, configured to receive a three-dimensional position of each object with respect to the visual input unit and category information of the object; a three-dimensional information storage unit, configured to store and update the three-dimensional position of each object with respect to the visual input unit and the category information of the object; a three-dimensional sound field response function unit, configured to store a personalized HRTFs response function in three-dimensional space; an acoustic coding unit, configured to store default and personalized acoustic codings; a three-dimensional sound field selection unit, configured to select a three-dimensional sound field response function according to three-dimensional position information of each object, and select an acoustic coding for the object according to the category information of the object; a three-dimensional sound field reconstruction unit, configured to obtain three-dimensional voice reconstructed for each object by convolving the response function of each object with the acoustic coding; a movement detection unit, configured to detect whether a variation occurred in the nine-axis inertial measurement unit with respect to the previous detection time exceeds a threshold, and record variations of a vertical bias angle, a horizontal heading angle, a horizontal rolling angle and a movement direction of the visual input unit at this moment; an update detection unit, configured to update a three-dimensional position of an obstacle among objects marked as being disappeared according to the variations detected by the movement detection unit, and update a three-dimensional position of a non-obstacle among the objects marked as being disappeared according to the displacement vector detected by the object displacement vector detection unit; and an attenuation processing unit, configured to attenuate the acoustic coding of the non-obstacle among the disappeared objects.

Further, the output module includes: a volume adjustment unit, configured to adjust a volume of outputted voice; and an output unit, configured to output, in real time, voice obtained after the auditory reconstruction is completed.

In summary, the auxiliary sensing method based on sensory substitution provided by the present disclosure is an innovative method for assisting blind people in sensing the outside world instead of visual sense. A visual image data conversion is performed using a deep learning pattern recognition method to allow complicated images to become simple labels, such that the blind people can more easily sense the surrounding environment. Different acoustic codings are proposed for each voice. Two types of different three-dimensional sound field processing methods are proposed for a fixed obstacle and a non-fixed obstacle, which is more advantageous to the travel of the blind people. Voice attenuation processing is adopted for objects beyond the field of view, which significantly improves user experience of the blind people. In short, the present disclosure provides an innovative visual alternative scheme for the blind people, which is advantageous to indoor and outdoor activities for the blind people.

It is to be noted that although the steps are described in a specific order above, it does not mean that the steps must be executed in the specific order mentioned above. In fact, some of these steps can be executed concurrently, or even the order can be changed, as long as required functionalities can be implemented.

The present disclosure may be a system, a method, and/or a computer program product. The computer program product may include a computer readable storage medium having computer readable program instructions thereon for causing a processor to carry out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically coding device such as punchcards or raised structures in a groove having instructions recorded thereon, and any suitable combination of the foregoing.

The descriptions of the various embodiments of the present disclosure have been presented above for purposes of illustration, but are not intended to be exhaustive or limited to the embodiments disclosed. Therefore, it is apparent to an ordinary skilled person in the art that modifications and variations could be made without departing from the scope and spirit of the embodiments. The terminology used herein is chosen to best explain the principles of the embodiments, the practical application or technical improvement over technologies found in the marketplace, or to enable others of ordinary skill in the art to understand the embodiments disclosed herein.

What is claimed is:
1. An auxiliary sensing method based on a sensory substitution, comprising:
  step S1: establishing a discrete horizontal plane included angle and a normal vector included angle in a three-dimensional space and response functions corresponding to different discrete distances, and establishing an acoustic coding library of an object;
  step S2: obtaining a surrounding environmental video in real time by using a visual input unit;
  step S3: obtaining object information and a category of a current environment by performing an object detection on each frame of a visual image based on the surrounding environmental video, and calculating a three-dimensional coordinate position of each object from the visual input unit through each frame of visual image information;

step S4: establishing a three-dimensional sound field of the object according to the visual image information, the object information and the three-dimensional coordinate position obtained in combination with the acoustic coding library of the object; and step S5: adjusting, for objects of different categories, the three-dimensional sound field of the each object according to movement information and variations of images, and playing the three-dimensional sound field of the each object in real time;

wherein the step S3 comprises:

importing the each frame of the visual image in a real-time video into a deep neural network, detecting the object by using the deep neural network to obtain an image position and a category of the each object in each frame of the visual input unit, and distinguishing between a fixed obstacle and a non-fixed obstacle;

segmenting an object frame to obtain an object image in a current frame;

abstracting the object image in the object frame to obtain a hash value of the object image in the current frame;

calculating a Hamming distance between a hash value of a left image and a hash value of a right image to obtain an image frame corresponding to a same object in the left image and the right image through the Hamming distance;

detecting whether the same object in the current frame and a previous frame of a detection image exists, marking the object as a non-disappearing object if the same object exists, calculating a displacement vector of the same object, and marking an object beyond an image visual field as a disappeared object;

performing a corner-point analysis on the object in the image frame of the left image and the right image to obtain a corner-point matrix of the object;

calculating a hash value of the corner-point matrix corresponding to the left image and the right image;

clustering by importing the hash value of the corner-point matrix corresponding to the left image and the right image into a same space;

searching for, through clustering, points with a closest hash value of each corner-point matrix for a pairwise coupling;

connecting pairwise coupled points;

calculating, according to an inertial measurement unit, a vertical bias angle from a horizontal plane generated by a head up and down movement of a current user, a horizontal heading angle generated by moving the head of the user from side to side between a plane perpendicular to a center line of the visual input unit in a previous state and the plane perpendicular to the center line of the visual input unit in a current state, and a horizontal rolling angle formed by a lateral inclination and a normal vector of the horizontal plane;

removing a corner point of corner points where a paired connecting line of connecting lines is a non-horizontal connecting line;

calculating distances of all objects with respect to the visual input unit according to selected corner points and the connecting lines;

calculating a vertical height of the object with respect to the horizontal plane of the visual input unit according to a calculated distance of the object with respect to the visual input unit and a vertical bias between the object and a center position of the visual input unit; and calculating a horizontal bias distance of the object with respect to a center of the visual input unit according to the calculated distance of the object with respect to the visual input unit as well as a horizontal bias between the object and the center position of the visual input unit.

2. The auxiliary sensing method of claim 1, wherein the step S1 comprises:

performing a calibration in horizontal and vertical directions by using data from an inertial measurement unit;

taking a picture of a user and a picture of an ear of the user;

calculating a head feature of the user based on the picture of the user and the picture of the ear taken;

importing the data from the inertial measurement unit and the picture of the ear into a deep learning network to obtain the discrete horizontal plane included angle and the normal vector included angle in the three-dimensional space and Head Related Transfer Functions (HRTFs) response functions corresponding to the different discrete distances; and performing an interpolation on the discrete horizontal plane included angle, and the normal vector included angle and discontinuous points of the HRTFs response functions corresponding to the different discrete distances using an interpolation method.

3. The auxiliary sensing method of claim 2, wherein the head feature of the user comprises a head breadth of the user, a head height of the user, a head depth of the user, an auricle height of the user, an auricle breadth of the user, a neck breadth of the user, a neck length of the user, a neck depth of the user, a torso top breadth of the user, a torso top height of the user, a torso top depth of the user, a shoulder breadth of the user, a head forward bias length of the user, a head forward bias height of the user, a seat height, a head circumference and a shoulder circumference of the user.

4. The auxiliary sensing method of claim 1, wherein the step S4 comprises:

searching for, according to categories of all objects obtained, the acoustic coding library corresponding to the each object;

obtaining a response function of the response functions of the each object by importing into an HRTFs response function according to a calculated distance of the each object with respect to a horizontal plane center of the visual input unit, a distance of the each object with respect to a vertical plane where the visual input unit is located, and a height of the each object with respect to a horizontal plane of the visual input unit; and calculating a stereo voice corresponding to the each object according to the acoustic coding library of the each object and the response function of the response functions of the each object calculated, wherein the acoustic coding library of the each object is known.

5. The auxiliary sensing method of claim 1, wherein the step S5 comprises:

calculating variation values of the vertical bias angle, the horizontal heading angle and the horizontal rolling angle for the previous frame and the current frame;

determining whether the variation values of the vertical bias angle, the horizontal heading angle and the horizontal rolling angle are within a threshold range, skipping the current frame and calculating the variation values of the vertical bias angle, the horizontal heading angle and the horizontal rolling angle for a next frame in response to the variation values of the vertical bias angle, the horizontal heading angle and the horizontal rolling angle being within the threshold range, or otherwise proceeding a next step;

determining a direction of a human movement based on the inertial measurement unit;

extracting a position of the fixed obstacle with respect to the fixed obstacle in a previous detection frame through the disappeared object;

calculating a position of the fixed obstacle marked as being disappeared in a current detection frame according to the variation values of the vertical bias angle calculated, the horizontal heading angle, the horizontal rolling angle and the direction of the human movement;

updating a three-dimensional position of the fixed obstacle marked as being disappeared;

importing the three-dimensional position of the fixed obstacle into the three-dimensional sound field of the fixed obstacle to determine whether a reminder range is exceeded, retaining the three-dimensional sound field of the fixed obstacle in response to the reminder range being not exceeded, or clearing the three-dimensional sound field of the fixed obstacle in response to the remainder range being exceeded;

searching for, according to an obtained non-fixed obstacle marked as being disappeared, a displacement vector of the non-fixed obstacle disappearing in the previous detection frame of a field of view of the image frame;

superimposing a voice from the non-fixed obstacle marked as being disappeared into a three-dimensional space vector of the voice from the non-fixed obstacle according to the displacement vector of the non-fixed obstacle;

updating three-dimensional coordinates of an HRTFs response function of the non-fixed obstacle marked as being disappeared;

attenuating an acoustic coding of the non-fixed obstacle to obtain a smoothed acoustic coding;

convolving the smoothed acoustic coding with the HRTFs response function of the non-fixed obstacle in response to a value of the smoothed acoustic coding being still greater than a threshold to obtain a three-dimensional sound field of the non-fixed obstacle at this moment, or clearing the three-dimensional sound field of the non-fixed obstacle in response to the value of the smoothed acoustic coding being equal to or less than the threshold; and obtaining a synthesized voice by simultaneously superimposing and synthesizing the three-dimensional sound field of the fixed obstacle marked as being disappeared, the three-dimensional sound field of the non-fixed obstacle marked as being disappeared, and the three-dimensional sound field corresponding to the object in the visual image.

6. A non-transitory computer readable storage medium, storing a computer program, wherein when being executed by a processor, the computer program implements steps of the auxiliary sensing method according to claim 1.

7. An auxiliary sensing system based on a sensory substitution, comprising:

a first module configured to establish a discrete horizontal plane included angle and a normal vector included angle in a three-dimensional space as well as response functions corresponding to different discrete distances, and to establish an acoustic coding library of an object;

a second module configured to obtain a surrounding environmental video in real time by using a visual input unit;

a third module configured to obtain object information and a category of a current environment by performing an object detection on each frame of a visual image based on the surrounding environmental video obtained, and to calculate a three-dimensional coordinate position of each object from the visual input unit through each frame of visual image information;

a fourth module configured to establish a three-dimensional sound field of the object according to the visual image information, the object information and the three-dimensional coordinate position obtained in combination with the acoustic coding library; and a fifth module configured to adjust, for objects of different categories, the three-dimensional sound field of the each object according to movement information and variations of images, and to play the three-dimensional sound field of the each object in real time;

wherein the third module is configured to perform:

importing the each frame of the visual image in a real-time video into a deep neural network, detecting the object by using the deep neural network to obtain an image position and a category of the each object in each frame of the visual input unit, and distinguishing between a fixed obstacle and a non-fixed obstacle;

segmenting an object frame to obtain an object image in a current frame;

abstracting the object image in the object frame to obtain a hash value H of the object image in the current frame;

calculating a Hamming distance between a hash value of a left image and a hash value of a right image to obtain an image frame corresponding to a same object in the left image and the right image through the Hamming distance;

detecting whether the same object in the current frame and a previous frame of a detection image exists, marking the object as a non-disappearing object if the same object exists, calculating a displacement vector of the same object, and marking an object beyond an image visual field as a disappeared object;

performing a corner-point analysis on the object in the image frame of the left image and the right image to obtain a corner-point matrix of the object;

calculating a hash value of the corner-point matrix corresponding to the left image and the right image;

clustering by importing the hash value of the corner-point matrix corresponding to the left image and the right image into a same space;

searching for, through clustering points with a closest hash value of each corner-point matrix for a pairwise coupling;

connecting pairwise coupled points;

calculating, according to an inertial measurement unit, a vertical bias angle from a horizontal plane generated by a head up and down movement of a current user, a horizontal heading angle generated by moving the head of the user from side to side between a plane perpendicular to a center line of the visual input unit in a previous state and the plane perpendicular to the center line of the visual input unit in a current state, and a horizontal rolling angle formed by a lateral inclination and a normal vector of the horizontal plane;

removing a corner point of corner points where a paired connecting line of connecting lines is a non-horizontal connecting line;

calculating distances of all objects with respect to the visual input unit according to selected corner points and the connecting lines;

calculating a vertical height of the object with respect to the horizontal plane of the visual input unit according to a calculated distance of the object with respect to the visual input unit and a vertical bias between the object and a center position of the visual input unit; and calculating a horizontal bias distance of the object with respect to a center of the visual input unit according to the calculated distance of the object with respect to the visual input unit as well as a horizontal bias between the object and the center position of the visual input unit.

\* \* \* \* \*